UNITED STATES PATENT OFFICE.

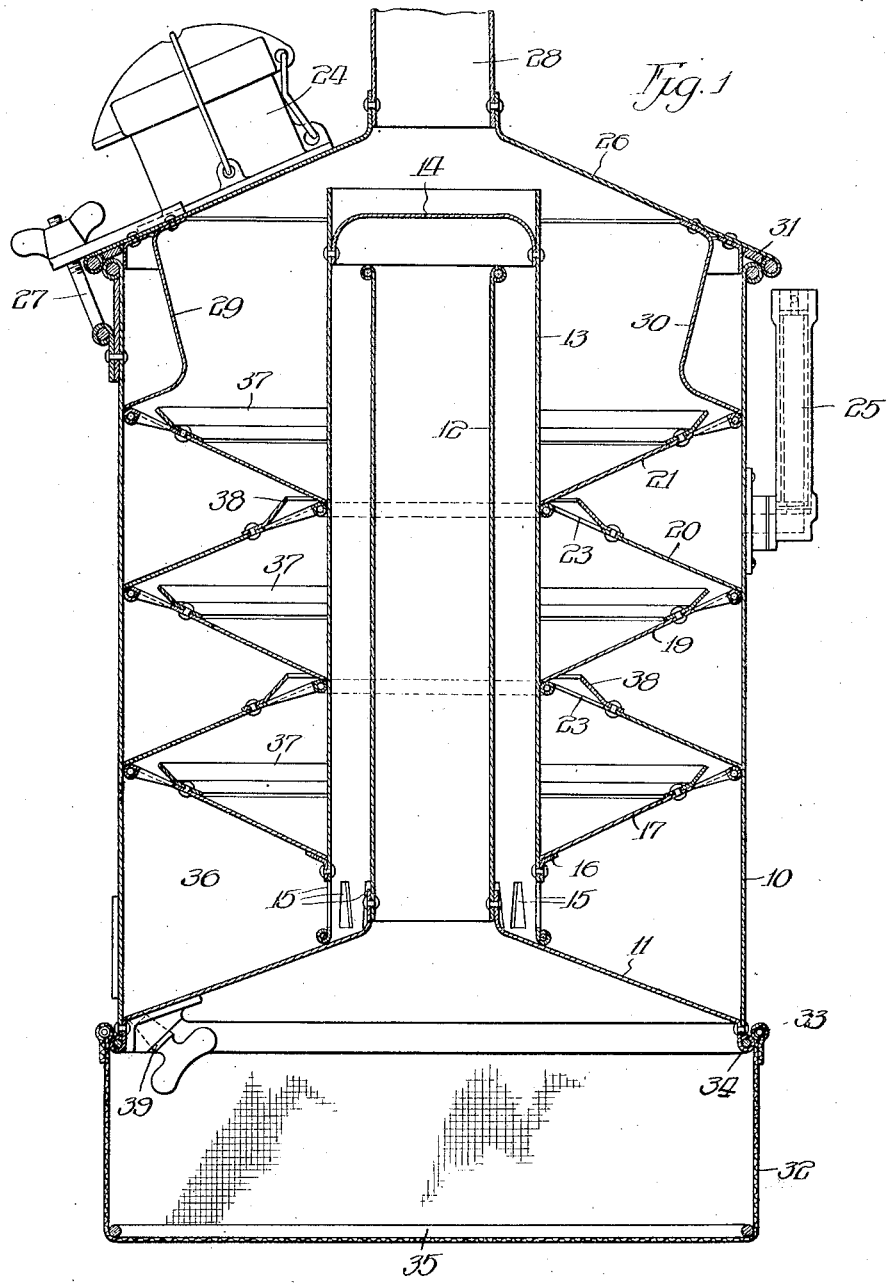

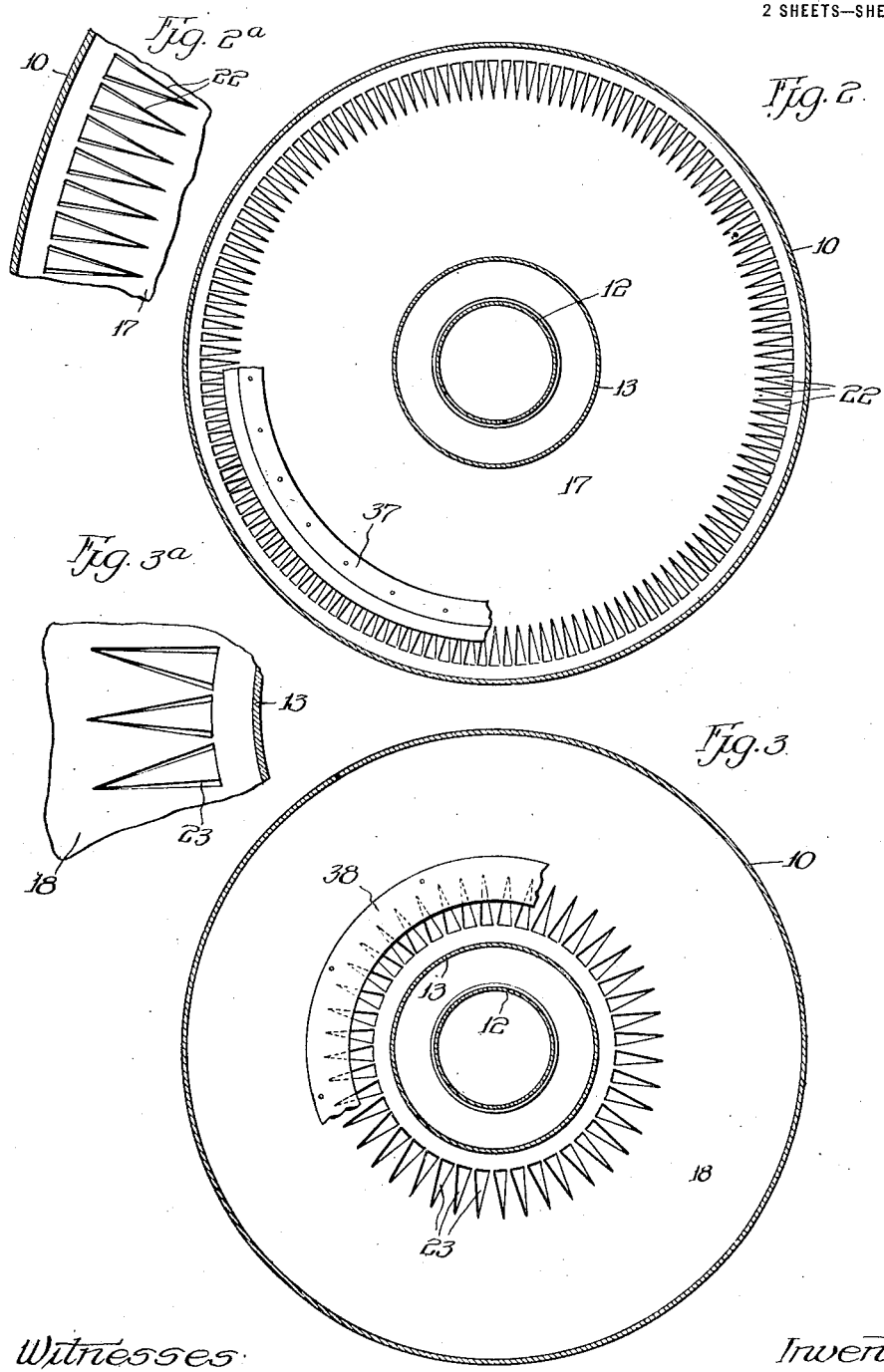

JOHN RIISE, OF DOYLESTOWN, OHIO.

AIR-CLEANER.

1,355,504. Specification of Letters Patent. Patented Oct. 12, 1920.

Application filed July 3, 1919. Serial No. 308,506.

*To all whom it may concern:*

Be it known that I, JOHN RIISE, a subject of the King of Norway, residing at Doylestown, in the county of Wayne and State of Ohio, have invented certain new and useful Improvements in Air-Cleaners, of which the following is a specification.

This invention relates to air cleaners.

As is well known, a great deal of carbureter and engine trouble is caused as the result of dust laden air passing into such parts. To overcome the injurious results occasioned by foreign particles, such as dust, in the carbureter and engine cylinder various devices have been made for extracting dust from the air prior to the time it enters the carbureter.

It is the object of my present invention to provide a novel, inexpensive and efficient air cleaner which may be readily assembled and taken apart and which is adapted to meet all the requirements of the particular use.

The invention is illustrated on the accompanying sheets of drawings, in which:

Figure 1 is a vertical sectional view of my improved air cleaner.

Fig. 2 is a plan view of one of the air baffles or deflectors forming a part of my invention, pointed openings being formed at the outer edge thereof.

Fig. 2ª is a fragmentary enlarged view of the baffle or air deflector shown in Fig. 2 showing the pointed openings more clearly.

Fig. 3 is a plan view of another baffle forming a part of my invention and having pointed openings near the inner portion of the baffle, and Fig. 3ª is a fragmentary enlarged view of the air baffle or deflector shown in Fig. 3 showing more clearly the pointed openings therein.

The various novel features of my invention will be apparent from the following description and drawings and will be particularly pointed out in the appended claims.

My air cleaner is of the water type in which air to be cleaned passes through the water in the form of bubbles, the theory of operation being that the bubbles are gradually reduced in size as a result of frictional engagement with baffle plates or deflectors, causing the air to give up the dust carried thereby, this action being increased by pointed or V-shaped openings in the baffle plates or deflectors, the air bubbles tending to pass through the narrowest part of the opening.

Referring to the figures of the drawings it will be noted that my air cleaner includes an outer cylindrical casing 10 and a cone-shaped bottom 11 which terminates at its center in a cylindrical air intake pipe 12. Surrounding this air intake pipe 12 is a central air guide tube 13 the lower end of which rests upon the casing bottom 11, the upper end of the tube 13 being sealed by a plate 14 whereby the air, after passing upwardly through the pipe 12, is directed downwardly in the tube 13 from which it passes through tapered openings 15 arranged circumferentially at the bottom thereof. Secured to the tube 13 near the bottom thereof is an annular bracket 16 which supports a conical baffle or air deflector 17, the outer edge of the baffle bearing against the casing 10. Mounted over and resting upon the outer edge of the baffle 17 is another baffle 18, the inner edge of which rests against the tube 13. Similarly baffles 19, 20 and 21 are in turn superimposed one upon the other. Near the outer periphery of baffle plates or deflectors 17, 19 and 21 a plurality of spaced circumferentially arranged cornered or V-shaped openings are provided, said openings preferably being formed by striking the material downwardly in a manner such that part of the struck down material is on each side of the opening, the openings 22 being pointed at their inner ends and gradually increasing in size toward their outer ends. Similarly plates or deflectors 18 and 20 near their inner edges are provided with a plurality of spaced circumferentially arranged V-shaped or pointed openings 23, the openings being larger at their inner edges than at the outer edges. These baffles 17 to 21 are submerged in water which may be passed into the casing through a water filler 24, the height of the water in the casing being indicated by a gage 25. A cover 26 fits over the upper end of the casing 10 and is secured thereto by a plurality of any suitable fastening members 27, said cover having a conduit 28 for the passage of purified air which will be directed to a carbureter or other suitable devices not shown. To prevent rattling between the cover and the casing a cushioning ring 31 is interposed therebetween. Secured to the underside of the cover 26 are springs 29 and 30 which yieldingly bear upon the upper baffle or plate for holding all of the baffles or deflectors in position.

Yieldingly clamped to the bottom of the casing 10 is a dust extracting member, such as cloth, 32, the cloth being yieldingly clamped to the casing by a spring ring 33 which fits over a bead 34 at the lower end of the casing, said cloth being retained in a spread out condition by a weighted ring 35 seated in the bottom of the cloth sack 32.

In operation the air is sucked into and through the air cleaner by the suction of the engine. A large part of the dust is removed from the air as the latter is drawn inwardly through the cloth 32, the air thus drawn into the casing containing some dust passing upwardly through the member 12 and downwardly through water between the member 12 and the tube 13, the air now passing in the form of bubbles radially outwardly through the oblong openings 15 in the lower end of tube 13 out into the main part of the casing 10. A certain amount of the dust will gravitate in passing into the water and will be deposited in the bottom of the casing. The air bubbles naturally will assume the highest possible position in any compartment. The air bubbles in passing outwardly through the oblong openings 15 pass into compartment 36, the air bubbles immediately rising and passing into engagement with the lower surface of the baffle plate 17 whereupon the air bubbles will roll outwardly along the under side of the member 17 and as a result of the friction thus created between the air bubbles and the member 17 the air bubbles will be reduced in size, exposing more intimately the dust in the air and thereby causing said dust to be separated from the air, whereupon it gravitates to the bottom of the casing 10. As the air bubbles near the outer periphery of the baffle 17 they pass into engagement with the struck down edges of the material forming the walls of the openings 22, thus tending to again divide the bubbles into smaller bubbles and cause the separation of dust from the air, at the same time the air bubbles having a tendency to squeeze through the openings at the first or pointed corners thereof, which also has a tendency to decrease the size of the bubbles and cause more dust to be extracted from the air. Upon passing through the openings 22 the air bubbles are deflected directly into engagement with the undersurface of the adjacent baffle 18 by deflectors 37 secured to the upper side of the baffle 17, whereupon the bubbles of air creep along the undersurface of baffle 18 and then pass through the openings 23 which have the same action upon the bubbles of air as the openings 22 in baffle 17. On passing through the openings 23 a deflector 38 secured to the upper side of baffle 18 directs the air into engagement with the undersurface of baffle 19, whereupon bubbles of air are further treated and eventually pass beyond all of the baffle plates and upwardly out through the conduit 28 in a purified condition ready for use in a carbureter or other device, it being understood that as the bubbles of air are made smaller and smaller more and more dust is taken out of the air, which dust collects in the bottom of the casing 10 and upon the upper surfaces of the baffles 17 to 21 inclusive. The tube 13 is extended upwardly into close proximity to the cover 26, forming a relatively small space through which the purified air may pass, the purpose of which is to cause the air to become dried to a certain extent before it passes into the carbureter. It is appreciated that the degree of moisture desired in purified air should vary between certain limits; for example, when kerosene or other relatively heavy hydrocarbons are being used it is advantageous to have more moisture in the air than when lighter hydrocarbons such as gasolene are being used as fuel. The amount of surface to which the purified air should be exposed above the water line in the casing 10 therefore may be varied in accordance with operating conditions. Such surface, if desired, may be in the form of baffles similar to baffles 17 to 21 inclusive, located above the water line.

To clean the air washer the cloth bag 32 may be readily sprung out of engagement with the casing 10 and a drain cock 39 opened for draining purposes. The baffle plates 17 to 21 inclusive and the tube 13 may be removed as a unit or separately through the top of the casing after removing the cover 26.

It is my intention to cover all modifications of the invention falling within the spirit and scope of the following claims:

I claim:

1. An air cleaner including submerged inclined baffles along which air bubbles are passed for decreasing the size of the latter as a result of frictional resistance for extracting dust therefrom, said baffles having pointed openings therein with struck down edges for further decreasing the size of the bubbles and extracting the dust therefrom.

2. An air cleaner including submerged inclined baffles along which air bubbles are passed for decreasing the size of the latter as a result of frictional resistance for extracting dust therefrom, said baffles having V-shaped openings therein with struck down edges for further decreasing the size of the bubbles and extracting the dust therefrom.

3. An air cleaner including concentrically arranged submerged baffles having pivoted openings arranged at opposite and upper extremities thereof, air in the form of bubbles being passed along said baffles and through said openings for decreasing the size of the bubbles and extracting dust therefrom.

4. An air cleaner including a plurality of concentrically arranged superimposed submerged conical baffles, adjacent baffles having openings respectively adjacent their outer and inner peripheries whereby air in the form of bubbles being purified are forced to take a relatively long path of movement and whereby the bubbles are decreased in size and dust removed therefrom.

5. An air cleaner including a submerged baffle having an opening by striking down the metal whereby air in the form of bubbles passing along said baffle and struck down edges are reduced in size and dust extracted therefrom.

6. An air cleaner including a casing having an air inlet and an air outlet, a plurality of submerged conical baffles mounted in said casing and having pointed openings formed by down turned edges and through which bubbles may pass and by means of which said bubbles are reduced in size and dust extracted therefrom.

7. An air cleaner including a casing having an air inlet and an air outlet, a plurality of oppositely inclined submerged superimposed apertured conical baffles mounted in said casing for reducing in size and extracting dust from bubbles of air passing through said casing.

8. An air cleaner comprising a casing having a bottom having a centrally arranged air tube through which air may pass upwardly, a tube surrounding said central tube closed at its upper end for causing air to pass downwardly, said second tube having openings at the bottom thereof, and a plurality of submerged superimposed adjacently arranged baffles within said casing and between the outer wall thereof and one of said tubes whereby air in the form of bubbles passing through the openings in one of said tubes may in turn pass over said baffles thereby being reduced in size and dust extracted therefrom.

9. An air cleaner comprising a casing having a bottom with a centrally arranged air tube through which air may pass upwardly, a tube surrounding said central tube closed at its upper end for causing air to pass downwardly, said second tube having openings at the bottom thereof, a plurality of submerged superimposed baffles within said casing and between the outer wall thereof and one of said tubes whereby air in the form of bubbles passing through the openings in one of said tubes may in turn pass over said baffle thereby being reduced in size and dust extracted therefrom, and dust extracting means secured to said casing.

Signed at Chicago, Illinois, this 26th day of June, 1919.

JOHN RIISE.